United States Patent [19]

Bilkadi et al.

[11] Patent Number: 5,677,050
[45] Date of Patent: Oct. 14, 1997

[54] RETROREFLECTIVE SHEETING HAVING AN ABRASION RESISTANT CERAMER COATING

[75] Inventors: Zayn Bilkadi, Mahtomedi, Minn.; David C. May, Hudson, Wis.

[73] Assignee: Minnesota Mining and Manufacturing Company, St. Paul, Minn.

[21] Appl. No.: 444,076

[22] Filed: May 19, 1995

[51] Int. Cl.⁶ .................................................. B32B 5/16
[52] U.S. Cl. ................... 428/331; 252/582; 252/589; 252/600; 428/336; 428/407; 428/409; 428/412; 428/446
[58] Field of Search .................................. 428/323, 331, 428/407, 412, 333, 336, 913, 446, 515, 519, 409; 252/600, 582, 589

[56] References Cited

U.S. PATENT DOCUMENTS

| | | | |
|---|---|---|---|
| 3,712,706 | 1/1973 | Stamm | 350/103 |
| 3,924,929 | 12/1975 | Holmen et al. | 350/103 |
| 4,188,451 | 2/1980 | Humphrey, Jr. | 428/331 |
| 4,340,319 | 7/1982 | Johnson, Jr. et al. | 404/16 |
| 4,349,598 | 9/1982 | White | 428/161 |
| 4,455,205 | 6/1984 | Olson et al. | 204/159.13 |
| 4,478,876 | 10/1984 | Chung | 427/54.1 |
| 4,486,504 | 12/1984 | Chung | 428/412 |
| 4,491,508 | 1/1985 | Olson et al. | 204/159.13 |
| 4,588,258 | 5/1986 | Hoopman | 350/103 |
| 4,596,622 | 6/1986 | Heenan et al. | 156/275.5 |
| 4,682,852 | 7/1987 | Weber | 350/105 |
| 4,726,706 | 2/1988 | Attar | 404/14 |
| 4,735,632 | 4/1988 | Oxman et al. | 51/295 |
| 4,753,548 | 6/1988 | Forrer | 404/15 |
| 4,755,425 | 7/1988 | Huang | 428/331 |
| 4,797,024 | 1/1989 | Forrer | 404/16 |
| 4,814,207 | 3/1989 | Siol et al. | 427/393.5 |
| 4,844,976 | 7/1989 | Huang | 428/323 |
| 4,875,798 | 10/1989 | May | 404/12 |
| 4,885,332 | 12/1989 | Bilkadi | 524/714 |
| 4,895,428 | 1/1990 | Nelson et al. | 350/103 |
| 4,906,523 | 3/1990 | Bilkadi et al. | 428/327 |
| 4,908,230 | 3/1990 | Miller | 427/54.1 |
| 5,053,177 | 10/1991 | Vetter et al. | 264/134 |
| 5,073,404 | 12/1991 | Huang | 427/39 |
| 5,104,929 | 4/1992 | Bilkadi | 524/847 |
| 5,126,394 | 6/1992 | Revis et al. | 524/548 |
| 5,258,225 | 11/1993 | Katsamberis | 428/331 |
| 5,368,941 | 11/1994 | Blizzard et al. | 428/412 |
| 5,374,483 | 12/1994 | Wright | 428/412 |
| 5,391,210 | 2/1995 | Bilkadi et al. | 51/298 |
| 5,418,304 | 5/1995 | Mueller | 526/245 |

FOREIGN PATENT DOCUMENTS

| | | | |
|---|---|---|---|
| 0 424 007 A2 | 4/1991 | European Pat. Off. | C09D 4/02 |
| 0 576 247 A2 | 12/1993 | European Pat. Off. | C09D 4/00 |
| 0 628 610 A1 | 12/1994 | European Pat. Off. | C09D 4/00 |
| 628610A | 12/1994 | European Pat. Off. | C09D 4/00 |
| 0 628 614 A1 | 12/1994 | European Pat. Off. | C09D 133/16 |
| WO 92/17337 | 10/1992 | WIPO | B32B 27/36 |
| WO 94/20581A | 9/1994 | WIPO | C09D 183/06 |
| WO 94/20581 | 9/1994 | WIPO | C09D 183/06 |

OTHER PUBLICATIONS

Lewis, L. & Katsamberis, D., *Journal of Applied Polymer Science*, 42, 1551–1156 (1991).

Schmidt, H., *Journal of Non–Crystalline Solids*, 100 57–64 (1988).

*Primary Examiner*—H. Thi Le
*Attorney, Agent, or Firm*—Karl G. Hanson

[57] ABSTRACT

Retroreflective sheeting having an abrasion-resistant ceramer coating that is prepared from about 20% to about 80% ethylenically unsaturated monomers; about 10% to about 50% of acrylate functionalized colloidal silica; and about 5% to about 40% N,N-disubstituted acrylamide or N-substituted-N-vinyl-amide monomer having a molecular weight between 99 and 500 atomic mass units; wherein said percentages are weight percents of the total weight of said coating. A method of coating retroreflective sheeting with an abrasion-resistant cured ceramer layer is also disclosed.

25 Claims, 1 Drawing Sheet

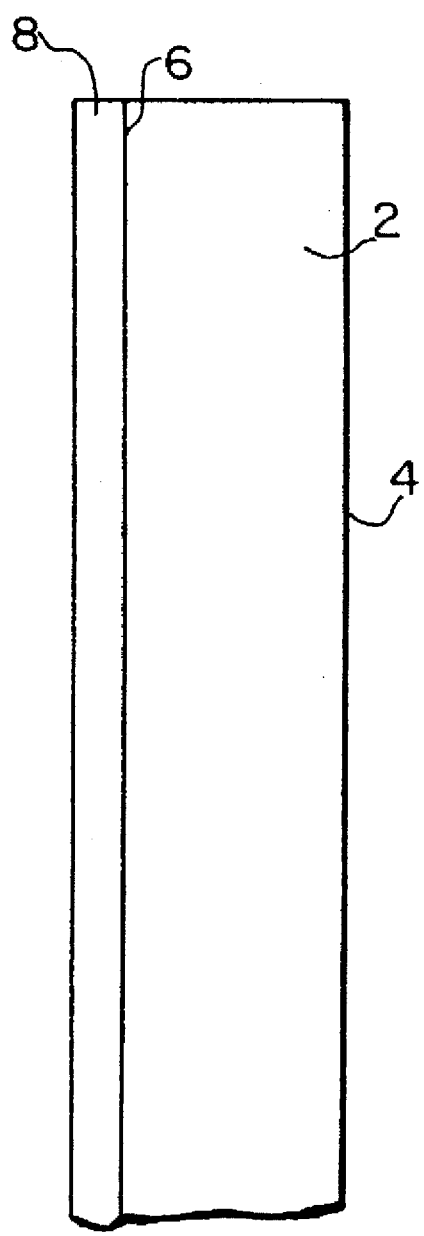

RETROREFLECTIVE SHEETING HAVING AN ABRASION RESISTANT CERAMER COATING

1. FIELD OF THE INVENTION

The present invention relates to retroreflective sheeting having an abrasion resistant coating and a method for making same. More specifically, the invention relates to retroreflective sheeting having a ceramer coating comprising an organic resin and silica particles.

2. INTRODUCTION

For many applications of retroreflective sheeting, and especially for retroreflective sheeting on raised pavement markers, abrasion-resistance and outdoor durability are essential properties for long life. Retroreflective sheeting on raised pavement markers is impacted by tires, and often sand, dirt or rocks are caught between the retroreflective sheeting and the tire. Frequently the surface of the retroreflective sheeting is unable to withstand these abrasive forces and, as a result, reflectivity of the pavement marker is diminished.

In many commercial retroreflective raised pavement markers, the surface of the retroreflector is protected by bonding a glass sheet to the surface of the retroreflector. Examples of retroreflective sheeting having a glass plate bonded to the surface are disclosed by Heenan et al., in U.S. Pat. No. 4,596,662 and Johnson et al., in U.S. Pat. No. 4,340,319. Use of a glass plate as an abrasion-resistant coating has disadvantages due to the increased production cost and occasional breakage of the glass plate caused by impact during use.

Besides using a glass plate, investigators in the retroreflective art have taken other approaches to protect retroreflective sheeting. For example, various efforts have been made to protect retroreflective sheeting by applying coating to the surface of the sheeting. In U.S. Pat. Nos. 4,753,548 and 4,797,024, Forrer applied a hard coat to the retroreflective sheeting made by UV curing of a composition comprising dipentaerythritol hydroxypentacrylate, 1,6 hexanediol diacrylate, methyl ethyl ketone and isobutyl isobutyrate along with stabilizers, a surfactant and a photoinitiator. Huang in U.S. Pat. Nos. 4,755,425, 4,844,976, and 5,073,404, applied an abrasion-resistant coating by treating the retroreflective sheeting with a dispersion of colloidal silica in polyurethane. This protective coating was found to have good adhesion to retroreflective sheeting with a polyurethane top layer; however, for sheeting with a polyacrylate top layer, it was found desirable to pre-treat the sheeting with a corona treatment to improve adhesion.

A variety of abrasion-resistant silica-particle-containing coatings for thermoplastic substrates generally (as opposed to specifically tailored to retroreflective sheeting) have been also disclosed. Katsamberis in U.S. Pat. No. 5,258,225 discloses a coating composition containing: multifunctional acrylate ester monomers; acrylate functionalized colloidal silica; multifunctional aliphatic acrylated urethanes; a UV absorber; and a photoinitiator that can be applied to thermoplastic substrates, especially polycarbonate substrates. Cottington et al. in U.S. Pat. No. 5,368,941 and EP 424 007 A2, disclose an abrasion-resistant coating composition containing: multifunctional acrylate monomers; an aminofunctional silane; colloidal silica; and an acrylate-terminated polyalkylene oxide or an acrylate ester monomer. Wright in U.S. Pat. No. 5,374,483, discloses a UV curable composition containing a multifunctional acrylate monomer, an aminoorgano-functional silane and colloidal silica. A UV curable abrasion-resistant coating with improved adhesion to polycarbonate is described in J. of Appl. Polymer Science 42, 1551–1556 (1991). Bilkadi in U.S. Pat. Nos. 4,885,332 and 5,104,929, discloses coating compositions containing colloidal silica and polyacryloyl monomers.

Humphrey, in U.S. Pat. No. 4,188,451, discloses a coating composition for polycarbonate substrates utilizing: a primer layer of a polyfunctional acrylic ester monomer and organosilane, and a top layer of silica filled organopolysiloxane. Schmidt, in J. Non-Cryst. Solids, 100, 57–64 (1988), reports the incorporation of organics in an inorganic matrix formed by sol-gel processing. Bilkadi, in U.S. Pat. No. 4,906,523 discloses the addition of silica sol to polymers in azeotropic solvents for imparting adhesion to inorganic oxide surfaces such as concrete.

UV curable coatings without silica particles have also been applied to thermoplastic substrates. For example, Bilkadi in copending U.S. patent application Ser. No. 08/426,495 (filed Apr. 20, 1995, 3M File Number 51654USA-8A, incorporated herein by reference) discloses the use of multifunctional acrylates and N,N-dialkylacrylamides as protective coatings on aircraft windows. Miller in U.S. Pat. No. 4,908,230, discloses a method of coating polycarbonate substrates at low temperatures (about 40° F.) that is reported to form good adhesion without hazing. Lake in WO 92/17337, discloses a UV curable composition comprising multifunctional acrylate and acrylated aliphatic urethanes. Siol et al. in U.S. Pat. Nos. 4,814,207 and 5,053,177, disclose abrasion-resistant acrylate coatings and a method for applying the coatings to sheeting in a continuous fashion.

SUMMARY OF THE INVENTION

In a first step, a ceramer precursor coating composition is applied to the surface of retroreflective sheeting. The coating composition comprises about 20% to about 80% of ethylenically unsaturated monomers; about 10% to about 50% of acrylate functionalized colloidal silica; and about 5% to about 40% of N,N-disubstituted acrylamide monomer or N-substituted-N-vinyl-amide monomer; wherein said percentages are weight percents of the total weight of said coating. The coating is then cured to form retroreflective sheeting having an abrasion-resistant, light transmissive ceramer coating.

The amide monomer must be a N, N-disubstituted monomer or a N-substituted-N-vinyl-amide monomer. It has been discovered that use of an acrylic acid or acrylic ester in place of the N,N-disubstituted acrylamide or N-substituted-N-vinyl-amide monomer yields coatings that adhere poorly to polycarbonate surfaces and do not weather well. It was also surprisingly discovered that use of acrylated urethanes in place of the N,N-disubstituted acrylamide or N-substituted-N-vinyl-amide monomer resulted in intractable compositions.

The N,N-disubstituted acrylamide or N-substituted-N-vinyl-amide monomer must also have a molecular weight between 99 (the molecular weight of N,N-dimethylacrylamide) and 500 atomic mass units. This molecular weight range is necessary for stabilizing the silica particles and for proper functioning of the coating.

In the present invention, the term "ceramer" is used to identify a fluid comprising surface-modified colloidal silica particles dispersed in a free-radically polymerizable organic liquid. The term "cured ceramer" is used to identify a material comprising inorganic (specifically, silica) particles attached or connected via covalent linkages to a crosslinked organic matrix. The term "acrylate," as used herein, encompasses acrylates and methacrylates. The term "disubstituted nitrogen" means that the acrylamide nitrogen atom, in addition to being the nitrogen of the acrylamide, has two substituents covalently bonded to the nitrogen. The term "light transmissive ceramer coating," means that the ceramer coating exhibits a light transmittance, as measured by ASTM D1003, of at least 75%, preferably at least 85% and more preferably at least 95%.

The ceramer composition can be coated on the retroreflective sheeting by methods known in the art, including: spraying, flowing, rolling, dip coating or knife coating. In many applications, especially applications in which the retroreflective sheeting has cube corner elements having an air interface, it is desirable to coat the sheeting without allowing the ceramer to flow onto the backside of the retroreflective sheeting because this can diminish its optical characteristics. After the composition is coated onto the sheeting, it is cured to form the abrasion-resistant ceramer coating. Since the retroreflective sheeting has a front surface made from a thermoplastic material, it is important in many instances that curing is conducted at a temperature below that at which the thermoplastic material deforms, and is preferably irradiated by UV light at room temperature in an air atmosphere.

The ceramer coating of the present invention provides numerous advantages for coating retroreflective sheeting, especially retroreflective sheeting in raised pavement, markers. Due to the inorganic/organic nature of the ceramer coatings, the coatings of the present invention can provide both excellent abrasion resistance and good flexibility. Coatings of the present invention also adhere well to retroreflective sheeting, especially polycarbonate sheeting, without fogging, hazing or the addition of priming agents.

Additional advantages of the coated retroreflective sheeting of the present invention include: the ability to withstand outdoor conditions with excellent resistance to moisture, light and heat; resistance to cracking and peeling; desirable optical properties such as transparency; and resistance to chemical attack and coloration by automotive engine oil and carbon black (such as the carbon black of tires).

Moreover, the coatings can be easily formulated, applied and cured, and they can be used without a primer layer because of their ability to bond directly to the surface of the retroreflective sheeting. Curing of the coatings can be conducted in air at room temperature.

BRIEF DESCRIPTION OF THE DRAWING

The drawing illustrates a cross section of a retroreflective sheet having a ceramer coat in accordance with the present invention.

DETAILED DESCRIPTION

The drawing illustrates a cross section of a preferred embodiment of the present invention. Retroreflective sheeting 2 having a reflecting interface 4 and a surface 6 is made abrasion-resistant by bonding a ceramer coating 8 to surface 6. In a preferred embodiment, interface 4 is an air interface that is protected by a hermetic seal. In another embodiment, the interface 4 is coated (typically by vapor deposition) with a metal layer.

The ceramer coatings of the present invention are applicable to retroreflective sheeting having a thermoplastic surface. Suitable retroreflective sheeting includes the lenses described in U.S. Pat. Nos. 3,712,706 to Stamm and 4,895,428 to Nelson et al.; U.S. Pat. No. 3,924,929 to Holmen, U.S. Pat. No. 4,349,598 to White, U.S. Pat. No. 4,726,706 to Attar, U.S. Pat. No. 4,682,852 to Weber and U.S. Pat. No. 4,588,258 to Hoopman, all of which are incorporated by reference herein. The retroreflective sheeting is preferably of the cube corner type such as that taught in the Nelson patents cited above. The lenses may be incorporated in a raised pavement marker such as that taught in U.S. Pat. No. 4,875,798 to May, incorporated by reference herein. Preferably the sheeting is formed from a sheet of polycarbonate resin. Ceramer coating compositions of the present invention are especially effective for use on polycarbonate sheeting. These coating compositions also work well on polyacrylics and clear polystyrene. The coatings adhere to polyester under laboratory conditions but tend to lose adhesion under outdoor conditions. It has been discovered that coatings of the present invention adhere better to hard sheeting. Preferred retroreflective sheeting has a thermoplastic surface having a Knoop hardness of at least 20 kg/mm$^2$.

The ethylenically unsaturated monomer is preferably a multifunctional ethylenically unsaturated ester of (meth)acrylic acid selected from the group consisting of a difunctional ethylenically unsaturated ester of acrylic or methacrylic acid, a trifunctional ethylenically unsaturated ester of acrylic or methacrylic acid, a tetrafunctional ethylenically unsaturated ester of acrylic or methacrylic acid, and combinations thereof. Of these, trifunctional and tetrafunctional ethylenically unsaturated esters of (meth)acrylic acid are more preferred.

Particularly preferred ethylenically unsaturated monomers have the formula:

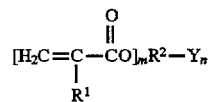

wherein $R^1$ represents a member selected from the group consisting of hydrogen, halogen, and lower alkyl group, preferably having one to four carbon atoms, more preferably hydrogen or methyl; $R^2$ represents a polyvalent organic group having a molecular weight of 14 to 1000 and a valence of m+n; m represents an integer designating the number of acrylic or methacrylic groups or both in the ester, preferably from 2 to 9, more preferably from 2 to 5, and where a mixture of acrylic or methacrylic monomers is used, preferably having an average value of 1.05 to 5; n represents an integer having a value of 1 to 5; and Y is selected from the group consisting of hydrogen, $C_1$–$C_5$ lower alkyl groups and protic functional groups, preferably selected from the group consisting of —OH, —COOH, —SO$_3$H, —SO(OH)$_2$, —PO(OH)$_2$, and oxazolidone. The polyvalent organic group $R^2$ can be cyclic or linear, branched, aromatic, aliphatic, or heterocyclic having nitrogen, nonperoxidic oxygen, sulfur, or phosphorus atoms. The acrylate ester monomers are employed in the coating at 20% to 80% by weight, more preferably at 30% to 70%.

Examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4- butanetriol, 1,2,5-pentanetriol, 1,3,6,-hexanetriol, and 1,5, 10-decanetriol; the triacylic acid and trimethacrylic acid esters of tris(hydroxyethyl) isocyanurate; the tetraacrylic and tetramethacrylic acid esters of aliphatic tetrols, such as 1,2,3,4-butanetetrol, 1,1,2,2,-tetramethylolethane, 1,1,3,3,-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof.

Preferably, for advantageous acid resistance, the multifunctional ethylenically unsaturated ester of (meth)acrylic acid is a nonpolyethereal multifunctional ethylenically unsaturated ester of (meth)acrylic acid. More preferably, the multifunctional ethylenically unsaturated ester of (meth) acrylic acid is selected from the group consisting of pentaerythritol triacrylate, pentaerythritol trimethacrylate, pentaerythritol pentacrylate and a combination thereof. Most preferably, the multifunctional ethylenically unsaturated ester of (meth)acrylic acid pentaerythritol triacrylate.

Silica sols useful for preparing ceramers can be prepared by methods well known in the art. Colloidal silicas dispersed as sols in aqueous solutions are also available commercially under such trade names as "LUDOX" (E. I. DuPont de Nemours and Co., Inc. Wilmington, Del.), "NYACOL" (Nyacol Co., Ashland, Mass.), and "NALCO" (Nalco Chemical Co., Oak Brook, Ill.). Non-aqueous silica sols (also called silica organosols) are also commercially available under such trade names as "NALCO 1057" (a silica sol in 2-propoxyethanol, Nalco Chemical Co, Oak Brook, Ill.), and "MA-ST", "IP-ST", and "EG-ST", (Nissan Chemical Industries, Tokyo, Japan). The silica particles preferably have an average particle diameter of 5 to about 1000 nm, more preferably 10 to 50 nm. Average particle size can be measured using transmission electron microscopy to count the number of particles of a given diameter. Additional examples of suitable colloidal silicas are described in U.S. Pat. No. 5,126,394, incorporated herein by reference.

To be used in the present invention, the silica particles must be acrylate functionalized. The term "acrylate functionalized" means the silica particles are functionalized with an acrylate or an alkylacrylate. The functionalized particles bond intimately and isotropically with the organic matrix. Typically the silica particles are functionalized by adding a silylacrylate to aqueous colloidal silica. Examples of acrylate functionalized colloidal silica are described in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are herein incorporated by reference.

It is highly preferred that the colloidal silica particles of the ceramer coating be derived from a sol rather than a colloidal silica powder. The use of colloidal silica powder results in an intractable mass that is unsuitable for coating as an aqueous sol. The addition of additives, such as high molecular weight polymers, may enable compositions derived from colloidal silica powder to be cast onto thermoplastic substrates; however, it is believed that the use of compositions containing colloidal silica powder will result in coatings having relatively poor optical transparency and/ or increased production costs and the use of such compositions is clearly not preferable in the coatings and methods of the present invention.

The colloidal silica particles are employed in the coating at 10% to 50% by weight, and more preferably at 25% to 40% by weight and still more preferably about 30% to 33% by weight.

Within the above described molecular weight and compositional limitations, the N,N-disubstituted acrylamide and or N-substituted-N-vinyl-amide monomers may independently contain the following substitutents including (but not limited to): $C_1$–$C_8$ alkyl, $C_2$–$C_8$ alkylene, and may be straight chain e.g. methyl, ethyl, propyl, butyl, or branched e.g. isopropyl, isobutyl, cycloalkane, e.g. cyclopentane, cycloalkene, e.g. cyclopentadiene, aryl, e.g. phenyl. The N-substituents may also be covalently linked such as in N-vinylpyrrolidone. The N-substituents may also be substituted with heteroatoms such as halide, e.g. fluoromethyl, chloromethyl, 1,2 dichloroethyl, oxygen, e.g. furfuryl, alkylalkoxy such as ethylmethoxide, nitrogen, e.g. nitrobenzyl, and sulfur, e.g. ethylthiomethyl.

In one embodiment, preferred substituents on the nitrogen of the N-substituted-N-vinyl-amide or N,N-disubstituted acrylamide monomer are independently a ($C_1$–$C_8$) alkyl group optionally having hydroxy, halide, carbonyl, and amido functionalities, a ($C_2$–$C_8$) alkylene group optionally having carbonyl and amido functionalities, a ($C_1$–$C_4$) alkoxymethyl group, a ($C_6$–$C_{10}$)aryl group, a ($C_1$–$C_3$)alk ($C_6$–$C_{10}$)aryl group, and a ($C_6$–$C_{10}$)heteroaryl group. In one preferred embodiment, both substituents of the N,N-disubstituted acrylamide are ($C_1$–$C_4$)alkyl groups.

In a preferred embodiment the N,N-disubstituted acrylamide has the formula $H_2CC(R^3)C(O)N(R^1)$ ($R^2$) wherein: $R^1$ and $R^2$ are each independently a ($C_1$–$C_8$)alkyl group optionally having hydroxy, halide, carbonyl, and oxo functionalities, a ($C_2$–$C_8$) alkylene group optionally having carbonyl and oxo functionalities, a ($C_1$–$C_4$) alkoxymethyl group, a ($C_6$–$C_{18}$)aryl group, a ($C_1$–$C_3$) alk ($C_6$–$C_{18}$)aryl group, and a ($C_6$–$C_{18}$)heteroaryl group; and $R^3$ is hydrogen, a halogen, or a methyl group.

Preferred N,N-disubstituted acrylamide and or N-substituted-N-vinyl-amide monomers are N,N-dimethylacrylamide and N-vinyl pyrrolidone and N,N-disubstituted acrylamide or N-substituted-N-vinyl-amide monomers that are functional equivalents, e.g. when utilized in the composition of the present invention they produce coatings on retroreflective sheeting that, after curing, exhibit: satisfactory dry adhesion; wet adhesion and resistance to elevated temperature; abrasion resistance; and weatherability, as these properties are measured according to the methods described herein in Test Procedures I–IV. More preferred functional equivalents also exhibit resistance to engine oil and carbon black as described herein in Test Procedures V and VI.

It is believed that the N,N-disubstituted acrylamide and N-substituted-N-vinyl-amide monomers are able to penetrate the surface of the retroreflective sheeting, especially polycarbonate sheeting, and thereby provide good adhesion. The N,N-disubstituted acrylamide and or N-substituted-N-vinylamide monomers are of relatively low molecular weight in order to stabilize the sol; larger molecules may lead to precipitation. Due to their relatively low toxicity, N,N-dimethylacrylamide, N,N-diethylacrylamide and N-vinyl pyrrolidone are sometimes preferred. Preferably, the molecular weight of the N,N-disubstituted acrylamide or N-substituted-N-vinyl-amide monomer is between 99 and 200 atomic mass units. It was discovered that adding acrylated urethanes to the ceramer compositions of the present invention resulted in flocculation and precipitation of the silica particles. Therefore it is preferred that the ceramer compositions do not contain any acrylated urethanes.

The N,N-disubstituted acrylamide monomer preferably is present in the coating at 5 and 40 percent by total weight of the coating, more preferably 10 to 30 weight percent, and still more preferably at 10 to 15 weight percent.

Other additives such as photoinitiators, UV stabilizers and antioxidants may be added to the compositions of the invention. Energy sources for curing include, but are not limited to: heat, ultraviolet light or visible light, x-ray and electron beam. A polymerization initiator may be added to the composition to assist in curing (although electron beam and x-ray curing processes typically do not require an added, initiator). Examples of initiators that may be suitable include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Other examples of suitable photoinitiators can be found in U.S. Pat. No. 4,735,632, incorporated herein by reference.

Optionally, the compositions may contain photosensitizers or photoinitiator systems that affect polymerization either in air or in an inert atmosphere such as nitrogen. These photoinitiators include compounds having carbonyl groups, tertiary amino groups and mixtures thereof. Among the preferred compounds having carbonyl groups are benzophenone, acetophenone, benzil, benzaldehyde, o-chlorobenzaldehyde, xanthone, thioxanthone, 9,10-anthraquinone, and other aromatic ketones that can act as photosensitizers. Among the preferred tertiary amines are methyldiethanolamine, and dimethylaminobenzoate. In general, the amount of photoinitiator may vary from about 0.01 to 10% by weight, more preferably from 0.25 to 4.0% by weight, based on the weight of the ceramer. A preferred photoinitiator is 1-hydroxycyclohexyl phenyl ketone.

In a preferred method, the ceramer coating composition is placed in a glass syringe fitted with a 1.0 micron Gelman Glass Acrodisc® filter. The composition is then pushed through the filter and flow coated onto polycarbonate retroreflective sheeting. The uncured ceramer coated pavement marker is then placed into a convection oven set at 60° C. for 2.5 minutes and transferred to curing station. Filtering out larger particles helps to improve optical transparency by minimizing light scattering. Preferably, the ceramer composition has a viscosity below 2400 centipoise.

The coating may be cured by art recognized methods including electron beam, UV radiation, visible light, and heat. Preferably curing is conducted at a temperature below the temperature at which the retroreflective sheeting deforms. Preferably, the composition is cured by UV irradiation in ambient air at room temperature. Low temperature curing processes prevent damage to lens optics and reduces processing costs.

The cured ceramer coating should be between 1 and 100 micrometers in thickness. Preferably, the film should be between 2 and 50 micrometers; and more preferably between 2 and 25 micrometers in thickness. Films between 4 and 9 micrometers in thickness have desirable properties such as good adhesion and abrasion resistance. Films that are too thin may not provide abrasion resistance, and films that are too thick tend to crack.

EXAMPLES

The following non-limiting examples further illustrate the invention. All parts, percentages, ratios, etc., in the examples are by weight unless indicated otherwise. The following abbreviations and trade names are used throughout:

| | |
|---|---|
| NNDMA | N,N-dimethyl acrylamide, available from Aldrich Chemical Co., Milwaukee, WI. |
| PETA | Pentaerythritol acrylate, available from Aldrich Chemical Co., Milwaukee, WI. |
| TMPTA | Trimethylol propane triacrylate, available from Aldrich Chemical Co., Milwaukee, WI. |
| Z6030 | 3-(trimethoxysilyl)propyl methacrylate, available from Dow Corning Co., Midland, MI. |
| OX-50 | Colloidal silica particles, having an average surface area of 50 $m^2$/gram, commercially available from Degussa Corp., Ridgefield Park, NJ. |
| HHA | Hydantoin Hexaacrylate, available from 3M Co., St. Paul, MN. |
| GDMA | Glycerol dimethacrylate, available from Akzo Co., Chicago, IL. |
| HEA | Hydroxyethyl acrylate, available from Rohm and Haas, Philadelphia, PA, under the trade name "Rocryl 420". |
| HEMA | Hydroxyethyl dimethacrylate, available from Rohm and Haas, Philadelphia, PA, under the trade name "Rocryl 400". |
| Tinuvin 292 | Methyl 1,2,2,6,6-pentamethyl-4-piperidinyl sebacate, available from Ciba-Geigy Corp., Hawthorne, New York. |
| Irgacure 184 | 1-hydroxycyclohexyl phenyl ketone. Available from Ciba-Geigy. |
| Nalco 2327 | An aqueous dispersion (40% solids) of colloidal silica particles having an average particle diameter of 20 nanometers, available from Nalco Chemical Co., Chicago, IL. |
| Nalco 1042 | An aqueous dispersion (30% solids) of colloidal silica particles having an average particle diameter of 20 nanometers, available from Nalco Chemical Co., Chicago, IL. |
| NVP | N-vinyl pyrrolidone, available from Aldrich Chemical Co., Milwaukee, WI. |

The following test procedures were used to evaluate the protective coatings of the present invention.

Test Procedure I: Dry Adhesion

This test was run according to ASTM Test Procedure D-3359-93 (Standard Test Methods for Measuring Adhesion by Tape Test), the disclosure of which is incorporated herein by reference. ASTM is a cross hatch adhesion test that determines how well the abrasion resistant coating adheres to the thermoplastic substrate. The test was carried out using a multiblade cutter commercially available from BYK/Gardner, Inc. of Silver Spring, Md., as BYK/Gardner 1MM, DIN/ISO. The cutter had six parallel blades spaced 1 mm (0.04 inch) apart. The test specimen was cut in a cross-hatch pattern according to FIG. 1 of ASTM D3359-93. After the cuts were made, the surface was brushed lightly to remove any surface debris. The adhesion of the coating was tested by applying a 2.5 cm wide piece of adhesive tape (Scotch Transparent Tape No. 600, commercially available from 3M Co., St. Paul, Minn.) to the surface, and then removing the tape at a 90° angle at a rapid rate. The grid was examined using an illuminated magnifier and rated according to the classification set forth in ASTM D3359-93. To provide an effective protective coating for a particular thermoplastic substrate, the crosslinked protective coating of this invention must exhibit an adhesion value of G+0/5B on the Gardner scale, which represents no delamination. That is, the edges of the cuts are completely smooth with none of the grid squares detached. A value of G+0/5B is needed to pass this test.

Test Procedure II: Adhesion Under Wet & Elevated Temperature Conditions

This test assesses the adhesion between the protective coating and the thermoplastic substrate after being submerged in water. A 2.5 cm sample of a coated substrate was submerged in a water bath that was continuously heated at 82° C. for 24 hours. At the end of the 24 hours, the sample was removed and examined for any delamination. To pass this test the coating must not show any delamination.

Test Procedure III: Abrasion Resistance

This test measures the Taber abrasion of the coating performed according to ASTM D1044-93 (Standard Method for Resistance of Transparent Plastics to Surface Abrasion) and ASTM D1003-61 (reapproved 1988, Standard Test Method for Haze and Luminous Transmittance of Transparent Plastics), the disclosures of which are incorporated herein by reference. Briefly, the test method involved measuring as reference point the initial haze value of a sample on the HAZEGARD™ PLUS tester (Gardner Co., Silver Springs, Md.) which complied with ASTM D1003-61. The sample was then abraded on a TABER HAZE tester for 500 cycles using a 500 gram load with a CS-10F wheel. The sample was then evaluated again on the HAZE-GARD PLUS tester. The test results are reported as the percent change in haze. Preferably, the percent change in haze for the crosslinked protective coating of this invention is less than 15%, more preferably less than about 10% and most preferably less than about 5% after 500 cycles of abrasion as described above. To pass this test, the % change in haze must be less than 15%.

Test Procedure IV: Weatherability

This test assesses the ability of the protective coating on the thermoplastic substrate to withstand weathering conditions (e.g., sunlight). The test was conducted according to ASTM Test Standard G-26-88, Type B, BH (Standard Practice for Operating Light Exposure Apparatus (Xenon-Arc Type) With and Without Water for Exposure of Nonmetallic Materials), the disclosure of which is incorporated herein by reference. Briefly, a sample was exposed to a 6500 Watt xenon burner filter by borosilicate inner and outer filters at 0.35 W/m$^2$ in a Water Cooled Xenon Arc Model 65XWWR Weathering Chamber, available from Atlas Electric Devices Co. (Chicago, Ill.) for repetitive cycles of 102 minutes at 63° C. followed by 18 minutes with a water spray. To provide an effective abrasion-resistant protective coating for a particular thermoplastic substrate (and thus pass this test), the crosslinked protective coating of the present invention must be capable of withstanding at least 1000 hours of exposure under these conditions with no significant yellowing, whitening, or other discoloration.

Test Procedure V: Chemical Resistance to Engine Oil

This test assesses the ability of the protective coating to resist degradation and discoloration upon prolonged exposure to automotive engine oil. The test involved completely immersing ceramer-coated retroreflective lenses in SAE 10W-30 automotive engine oil (Valvoline) for 10 hours at 20° C. After each immersion period the coated lenses were washed with detergent water and inspected visually for discoloration. The coated lenses were then subjected to at least 3 rubs with grade 0000 steel wool to assess their abrasion resistance. Finally, the coated lenses were then subjected to the cross-hatch adhesion test described in Test Procedure I. To provide a satisfactory coating for the retroreflective lens the cured ceramer coatings of the present invention must exhibit after the above stated immersions in automotive oil: 1. no visually noticeable discoloration, cracking or crazing; 2. it must resist any scratching upon rubbing with grade 0000 steel wool; and 3. it must exhibit no delamination or loss of adhesion as determined by Test Procedure I.

Test Procedure VI: Chemical Resistance to Engine Oil/Carbon Black

This test assesses the protective coating's ability to resist degradation and discoloration upon exposure to a hot suspension of carbon black in automotive engine oil. This suspension was prepared by vigorously mixing 4 parts carbon black to 90 parts Valvoline SAE 10W-30 engine and heating the suspension to 75° C. The test involved completely immersing ceramer-coated retroreflective lenses for 15 minutes in the heated suspension. After each immersion period the coated lenses were washed with detergent water and inspected visually for any discoloration. The coated lenses were then subjected to at least 3 rubs with grade 0000 steel wool to assess their abrasion resistance. Finally, the coated lenses were then subjected to the cross-hatch adhesion test described in Test Procedure I. To provide a satisfactory coating for the retroreflective lens, the cured ceramer coatings of the present invention must exhibit after the above stated immersion in the carbon black/automotive oil dispersion: 1. no visually noticeable discoloration, cracking or crazing; 2. it must resist scratching upon rubbing with grade 0000 steel wool; and 3. it must exhibit no delamination or loss of adhesion as determined by Test Procedure I.

Preparation 1:

The following materials were charged into a 10 liter round-bottomed flask: 1195 grams (g) Nalco 2327, 118 g NNDMA, 60 g Z6030 and 761 g PETA. The flask was then placed on a Bucchi R152 rotary evaporator (available from Bucchi Laboratory AG, Flanil, Switzerland) with the bath temperature set at 55° C. A refrigerated mixture of 50% deionized water/50% antifreeze (Texaco) recirculated through the cooling coils. Volatile components were removed at a reduced pressure of approximately 25 Torr until the distillation rate was reduced to less than 5 drops per minute (approximately 2 hours). The resulting material (1464 g) was a clear liquid, containing less than 1% water (determined by Carl Fisher Titration) and comprising 54.2% PETA, 8.4% NNDMA, and 38.8% acrylated silica. This material is designated CER1.

Preparation 2:

Preparation 1 was repeated except that the amount of Z6030 was 120 g. The resulting CER2 comprised 39.6% acrylated silica, 8.1% NNDMA, and 52.3% PETA.

Preparation 3:

In a glass round bottom flask were mixed 100 g Nalco 1042 silica sol, 8.4 g Z6030 and 34 g NVP. The round bottom flask was attached to a Bucchi rotary evaporator and heated in the water bath to 65° C. Volatile components were removed at a reduced pressure of approximately 25 Torr until the distillation rate was reduced to less than 5 drops per minute (approximately 25 minutes). The resulting material (74.9 g) was a perfectly clear liquid with a very slight purple tinge. To this clear material were added with vigorous mixing 15 g PETA, 0.88 g Irgacure 184 and 0.07 g Tinuvin 292. The resulting material is designated CER3 and comprised 45% acrylated silica, 16.5% PETA, 37.4% NVP, 1% Irgacure 184 and 0.1% Tin292.

Example 1

29.8 parts CER1 were mixed with 0.2 parts Tinuvin 292, 70 parts isopropanol, and 1.2 parts Irgacure 184 photoinitiator. The mixture was filtered through a 1.0 micrometer polypropylene filter (Gelman glass Acrodisc®, available from Fisher Scientific, Chicago, Ill.) and then flow coated on the retroreflective polycarbonate lenses of two-way raised pavement markers (Model 280-2W available from 3M Company, St. Paul, Minn.). Immediately after the flow-coating operation was completed (about 30 seconds) each of the coated pavement markers was then placed for 2.5 minutes in a forced-air convection oven where the temperature was maintained at 60° C. This insured that substantially all of the isopropanol solvent flashed-off. The coated pavement marker was then placed on a conveyor belt of UV processor Model QC1202 (available from PPG Industries, Plainfield, Ill.) equipped with a high-pressure mercury lamp. The following process parameters were utilized to cure the coated raised pavement marker: line speed—55 feet/minute; voltage—410 volts; energy—90 mJ/cm$^2$; atmosphere-air. The resulting cured protective coating on the retro-reflective polycarbonate lens was perfectly clear and adhered to the polycarbonate retroreflective lens. The resulting coating passed Test Procedures, I, II, III, IV, V and VI.

Example 2

29.8 parts CER2 were mixed with 0.2 parts Tinuvin 292, 70 parts isopropanol, and 1.2 parts Irgacure 184 photoinitiator. This transparent liquid was flow coated and cured on the retroreflective polycarbonate lenses of 15 raised pavement markers (Model 280-2W available from 3M) using the same procedures described in Example 1. The resulting cured protective coating on the retro-reflective polycarbonate lens was clear and adhered to the polycarbonate retroreflective lens. The coating passed Test Procedures I, II, III, IV, V and VI.

Example 3

A 30% solution of CER3 in isopropanol was coated with a #12 wire-wound coating bar (RD Specialties, Rochester, N.Y.) on a series of thermoplastic substrates made from polyethylene terephthalate, polycarbonate, and polymethyl methacrylate. The coated sheets were cured as described in Example 1. The resulting protective coatings on the coated sheets passed Test Procedures I, II, III, IV, V and VI.

Comparative Preparation 1:

This composition contains only acrylated silica and NNDMA, but no ethylenically unsaturated monomers. The following materials were mixed in a 1 liter round bottom flask: 100 g Nalco 2327, 8.2 g Z6030 and 40 g NNDMA. The round bottom flask was attached to a Bucchi rotary evaporator and heated in the water bath to 55° C. After approximately five minutes of heating, the mixture began to thicken and then gelled. About 40 g of isopropanol was added to redissolve the gel. Volatile components were removed at a reduced pressure of approximately 25 Torr until the distallation rate was reduced to less than 5 drops per minute (approximately 25 minutes). The resulting transparent liquid (86.7 g) is designated COMP1 and comprised nominally 53.9% acrylated silica and 46.1% NNDMA.

Comparative Example 1A:

A coating solution was prepared by mixing 29.8 parts COMP1 with 0.2 parts Tinuvin 292, 70 parts isopropyl alcohol and 1.2 parts Irgacure 184. The coating solution was coated with a #12 wire-wound coating bar (RD Specialities, Rochester, N.Y.) on a several sheets of polymethyl methacrylate (Acrylite GP sheets obtained from Cyro Industries, Milford, Conn.). After baking the coated sheets for 2.5 minutes in a forced air oven at 60° C. to remove the volatile solvent (isopropanol) the coated sheets were passed under two high pressure mercury lamps installed in an RPC Ultraviolet light curing station (manufactured by PPG Industries, Fairfield, Ill.). It was found that when the coated sheets were passed under the UV curing lamps in an ambient atmosphere, the protective coating did not cure and remained tacky and runny. When the atmosphere in the curing chamber was saturated with nitrogen gas, the coating cured but failed all of the Test Procedures enumerated above. The hardened coating was soluble in water and completely disintegrated under Test Procedure II.

Comparative Example 1B:

The coating solution of Comparative Example 1A was coated on a several sheets of polycarbonate (125 micrometer thick, obtained from Tekra Corp., New Berlin, Wis.) using a #12 wire-wound coating bar (RD Specialties, Rochester, N.Y.). Immediately after the coating solution was applied, the polycarbonate turned opaque white and its surface cracked and crazed, indicating that the coating solution was corrosive to the polycarbonate and therefore unsuitable as a protective coating for retroreflective sheeting made from polycarbonate thermoplastic.

Comparative Preparation 2:

Preparation 1 was repeated, except that no N-substituted-N-vinyl-amides or N,N-disubstituted acrylamides were used. The following materials were charged into a 10 liter round-bottom flask: 1195 g Nalco 2327, 60 g Z6030 and 761 g PETA. Because the PETA was not soluble in the aqueous dispersion, a white precipitate formed on the flask bottom. The white precipitate did not redisperse when the mixture was heated to 55° C. When the inhomogeneous mixture was subjected to vacuum in the Bucchi R152 rotary evaporator with the bath temperature set at 55° C., the white precipitate further solidified and became intractable as the volatile materials were removed by distillation. It was not possible under these circumstances to obtain a homogeneous liquid dispersion suitable for coating on retroreflective sheeting.

Comparative Example 3:

This composition contains no N,N-disubstituted acrylamide or N-substituted-N-vinyl-amide monomer. Instead, it contains a monoethylenically unsaturated ester of acrylic acid called HEA which has a molecular weight of 116. The example shows that the use of small molecules (of molecular weight 100–200) instead of the appropriate acrylamides or NVP, fails to make an optically transparent protective coating for retroreflective sheeting.

The following materials were mixed together in a round bottom flask: 85 g Nalco 2327, 8.2 g Z6030, 34 g HEA and 74.1 g TEGDA. The round bottom flask was attached to a Bucchi rotary evaporator and heated in the water bath to 65° C. Volatile components were removed at a reduced pressure of approximately 25 Torr until the distillation rate was reduced to less than 5 drops per minute (approximately 25 minutes). The resulting material was a clear liquid. However, when 0.07 g Tinuvin 292 was added to the mixture, the mixture spontaneously turned milky white gel. Coatings from this white gel were not optically transparent and therefore not useful as protective coatings for retroreflective sheeting.

Comparative Example 4:

This example demonstrates that use of commercially available colloidal silica powder (OX-50) instead of silica sol (Nalco 2327) is not suitable for preparing transparent protective coatings for thermoplastic substrates when prepared in a manner similar to Example 1. Preparation 1 was repeated but instead of 1195 g Nalco 2327 (which is 40% monodispersed silica particles) we used an equivalent amount of OX-50 and distilled water: In a 10 liter round bottom flask were mixed 478 g OX-50, 717 distilled water, 118 g NNDMA, 60 g Z6030 and 761 g PETA. The flask was then placed on a Bucchi R152 rotary evaporator with the bath temperature set at 55° C. A refrigerated mixture of 50% deionized water/50% antifreeze (Texaco) recirculated through the cooling coils. Volatile components were removed at a reduced pressure of approximately 25 Torr until the distillation rate was reduced to less than 5 drops per minute (approximately 2 hours). The resulting material (1405 g) was a free-flowing white powder that did not redisperse in water or isopropanol or methyl ethyl ketone and was therefore unsuitable for providing coatable solutions.

Comparative Example 5:

This example demonstrates that use of a urethane acrylate instead of an N,N-disubstituted acrylamide or N-substituted-N-vinyl-amide is not suitable for preparing transparent protective coatings for retroreflective sheeting. Preparation 1 was repeated except that a urethane acrylate was used instead of NNDMA. The following materials were charged into a 1 liter round-bottom flask; 119.5 g Nalco 2327, 11.8 g Photomer 6160 (an aliphatic urethane acrylate from Henkel, Ambler, Pa.), 12 g Z6030 and 76.1 g PETA. A white precipitate formed that did not dissolve even upon vigorous mixing and heating to 55° C. The inhomogeneous mixture was subjected to vacuum in the Bucchi rotary evaporator with the bath temperature set at 55° C. The white precipitate further densified and became intractable. It was not possible under these circumstances to obtain a homogeneous liquid dispersion suitable for coating on retroreflective sheeting.

Modifications and variations of the above-described embodiments of the present invention are possible, as appreciated by those skilled in the art in light of the above teachings. For example, the colloidal silica particles can be functionalized before mixing with the acrylate monomers. It is therefore to be understood that, within the scope of the appended claims and their equivalents, the invention may be practiced otherwise than as specifically described.

We claim:

1. A coated retroreflective sheet comprising:
   (i) a retroreflective sheet having a thermoplastic surface; and
   a coating on the thermoplastic surface, the coating being capable of transmitting light when cured and comprising:
   (a) about 20% to about 80% of ethylenically unsaturated monomer;
   (b) about 10% to about 50% of acrylate functionalized colloidal silica; and
   (c) about 5% to about 40% of an amide monomer selected from the group consisting of N,N-disubstituted acrylamide monomer, N-substituted-N-vinyl-amide monomer, and a combination thereof, wherein the amide monomer has a molecular weight between 99 and 500 atomic mass units; and wherein the percentages are weight percents of the total weight of the coating.

2. The coated retroreflective sheet of claim 1 wherein said ethylenically unsaturated monomer is a multifunctional acrylate ester.

3. The coated retroreflective sheet of claim 2 wherein the amide monomer has a molecular weight between 99 and 200 atomic mass units.

4. The coated retroreflective sheet of claim 3 wherein said amide monomer is present in an amount between about 10% to about 15% by weight of the total coating.

5. The coated retroreflective sheeting of claim 2 wherein said multifunctional acrylate ester monomer is present in the range from about 30% to about 70% by weight of the total coating.

6. The coated retroreflective sheeting of claim 2 wherein said surface comprises polycarbonate and said amide monomer is selected from the group consisting of N,N-dimethylacrylamide, N,N-diethylacrylamide and N-vinyl pyrrolidone.

7. The coated retroreflective sheeting of claim 6 wherein said colloidal silica particles have an average particle size between 10 to 50 mm.

8. The coated retroreflective sheeting of claim 2 wherein said surface consists essentially of a hard polymer having a Knoop hardness of at least 20 kg/m$^2$.

9. The coated retroreflective sheet of claim 2 wherein said coating does not contain acrylated urethanes.

10. The coated retroreflective sheet of claim 1 wherein said ethylenically unsaturated monomer is selected from the group consisting of a trifunctional ethylenically unsaturated ester of acrylic or methacrylic acid, a tetrafunctional ethylenically unsaturated ester of acrylic or methacrylic acid, and a combination thereof.

11. The coated retroreflective sheet of claim 1 wherein said ethylenically unsaturated monomer is a acrylic or methacrylic acid ester of a polyhydric alcohol, or a mixture thereof.

12. The coated retroreflective sheet of claim 1 wherein the ethylenically unsaturated monomer comprises a free-radically curable monomer having the formula:

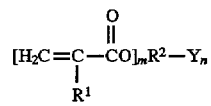

wherein $R^1$ represents a member selected from the group consisting of hydrogen, halogen, and $C_1$–$C_5$ alkyl; $R^2$ represents a polyvalent organic group having a molecular weight of 14 to 1000 and having a valence of m+n; m represents an integer designating the number of acrylic or methacrylic groups or both in the ester; n represents an integer having a value of 1 to 5; and Y represents a member selected from the group consisting of hydrogen, $C_1$–$C_5$ alkyl group, and protic functional group.

13. An abrasion-resistant retroreflective sheeting comprising retroreflective sheeting having a thermoplastic surface and having a cured, light transmissive ceramer coating disposed over the thermoplastic surface; the cured ceramer coating being capable of demonstrating a percent change in haze that is less than 15 percent when tested in accordance with ASTM-D1003-61 prepared from a mixture comprising about 20% to about 80% of ethylenically unsaturated monomer; about 10% to about 50% of acrylate functionalized colloidal silica; and about 5% to about 40% of an amide monomer selected from the group consisting of N,N-disubstituted acrylamide monomer, N-substituted-N-vinyl-amide monomer, and a combination thereof; wherein the amide monomer has a molecular weight between 99 and 500 atomic mass units; and wherein the percentages are weight percents of the total weight of the coating.

14. The abrasion-resistant retroreflective sheeting of claim 13 wherein the coating has a thickness of about 2 micrometers to about 25 micrometers.

15. The abrasion-resistant retroreflective sheeting of claim 14 additionally comprising a UV stabilizer in the cured ceramer coating.

16. The abrasion-resistant retroreflective sheeting of claim 14 wherein said coating has a light transmittance of at least 85% as measured by ASTM D1003.

17. The abrasion-resistant retroreflective sheeting of claim 13 wherein said surface comprises polycarbonate and said amide monomer is selected from the group consisting of N,N-dimethylacrylamide, N,N-diethylacrylamide and N-vinyl pyrrolidone.

18. A retroreflective raised pavement marker comprising abrasion-resistant retroreflective sheeting of claim 17.

19. The abrasion-resistant retroreflective sheeting of claim 13 wherein said ethylenically unsaturated monomer is a multifunctional acrylate ester.

20. The abrasion-resistant retroreflective sheeting of claim 13 wherein said coating exhibits: satisfactory dry adhesion; satisfactory wet adhesion under elevated temperature; abrasion resistance; and weatherability, as these properties are measured according Test Procedures I–IV.

21. A method of making an abrasion-resistant retroreflective sheeting comprising the steps of:

(a) coating a retroreflective sheet with a ceramer composition, the composition comprising about 20% to about 80% of ethylenically unsaturated monomer; about 10% to about 50% of acrylate functionalized colloidal silica; and about 5% to about 40% of an amide monomer selected from the group consisting of N,N-disubstituted acrylamide monomer, N-substituted-N-vinyl-amide monomer; and a combination thereof, wherein the amide monomer has a molecular weight between 99 and 500 atomic mass units; and wherein the percentages are weight percents of the total weight of said coating; and (b) curing said precursor composition to form a cured light transmissive ceramer coating on the retroreflective sheet, the cured ceramer coating being capable of demonstrating a percent change in haze that is less than 15 percent when tested in accordance with ASTM-D1003-61.

22. The method of claim 21 wherein said precursor composition further comprises a photoinitiator and said composition is cured by UV radiation.

23. The method of claim 22 wherein said amide monomer is selected from the group consisting of N,N-dimethylacrylamide and N,N-diethylacrylamide.

24. The method of claim 21 wherein said colloidal silica is functionalized in situ by the addition of a silylacrylate in an aqueous silica sol.

25. The method of claim 24 wherein said ethylenically unsaturated monomer, said acrylate functionalized colloidal silica and said amide monomers are combined in aqueous sol, and then the water is removed to form a viscous, clear ceramer composition without the formation of a precipitate.

* * * * *